Nov. 3, 1936.  T. J. GERWER  2,059,990
WINDSHIELD DEFROSTER
Filed Sept. 27, 1934
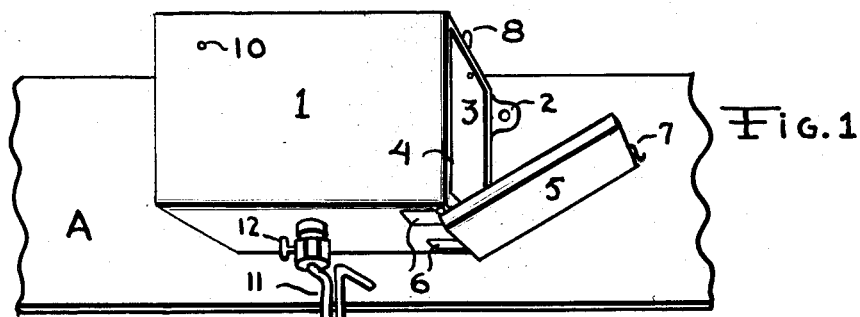
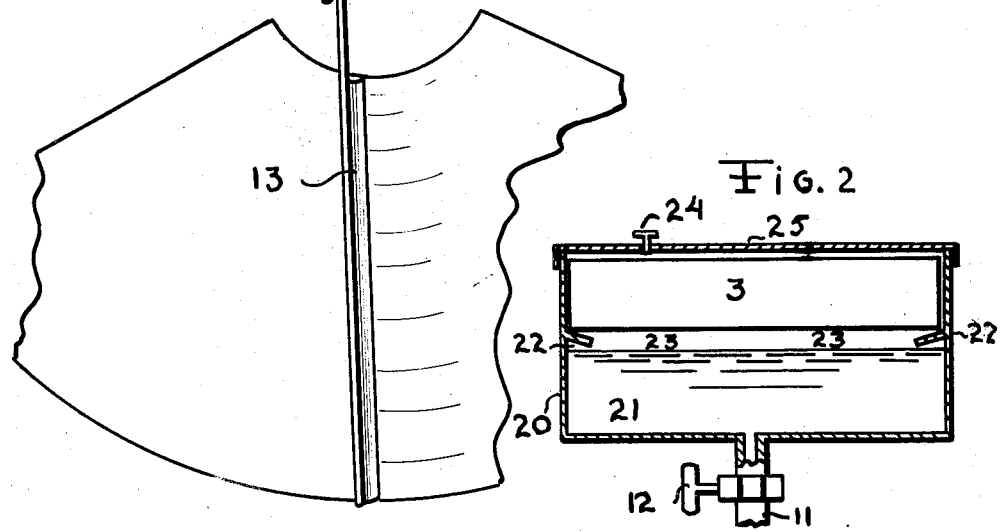
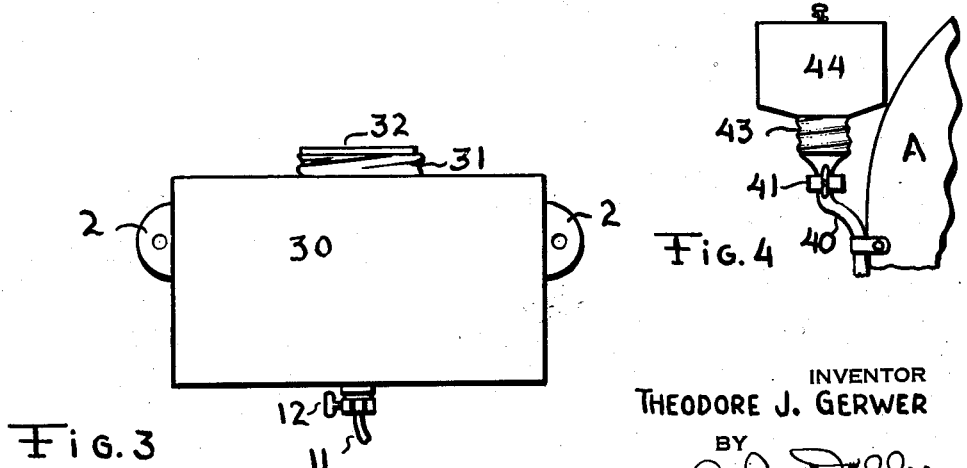
INVENTOR
THEODORE J. GERWER
BY
ATTORNEY Patented Nov. 3, 1936

2,059,990

UNITED STATES PATENT OFFICE 2,059,990

WINDSHIELD DEFROSTER

Theodore J. Gerwer, West New Brighton, Staten Island, N. Y.

Application September 27, 1934, Serial No. 745,662

1 Claim. (Cl. 20—40.5)

The present invention relates to a method of preventing frost or ice from forming on a windshield and to an apparatus therefor.

In the use of automobiles in winter and particularly in cold climates, it is not at all uncommon to encounter severe low-temperature weather conditions in which snow and rain freeze on the windshield to such an extent that it is practically impossible to maintain a clear vision therethrough. Several proposals have been suggested to overcome the difficulties but all of them have serious shortcomings. When windshield wipers of the usual type were used the snow clung to the windshield and was only partly brushed aside by the wiper. Enough ice remained to freeze solidly onto the glass. As the snow continued to fall, a layer of ice was soon built up on the windshield which actually stopped the movement of the wiper and made driving highly dangerous if not practically impossible. Electric heaters likewise have been proposed which generally consisted of heating elements mounted on the inside of the windshield which derived their electrical energy from the battery of the car. This method, needless to say, was quite expensive and was a great drain on the battery, particularly when the heater was used for long distances or sustained service. Although many attempts have been made to overcome these and other shortcomings of the prior art, none, as far as I am aware, has been completely successful in practical operation.

It is an object of the present invention to provide a method for maintaining a region of a windshield clear and free from ice to give clear visibility to the driver.

It is another object of the present invention to provide an auxiliary device which is capable of being attached to an automobile and which is adapted to supply the windshield with a coating or film of non-freezing liquid.

It is a further object of the present invention to provide a source of non-freezing liquid which acts in conjunction with a conventional windshield wiper.

It is also an object of the present invention to provide a windshield fluid container which may be readily and easily filled and refilled with an inexpensive non-freezing liquid.

It is likewise within the contemplation of the present invention to provide a windshield fluid reservoir which may be incorporated in any automobile, vehicle, airplane, boat or the like in an inexpensive, simple and commercially feasible manner.

Other objects and advantages of the present invention will become apparent from the following description taken in conjunction with the accompanying drawing, in which:—

Fig. 1 is a perspective view of an embodiment of the present invention which is capable of being attached to the outside of an automobile;

Fig. 2 illustrates a sectional view of a modified embodiment of the present invention;

Fig. 3 depicts a front view of a further modified embodiment of a container used to carry the present invention into practice; and Fig. 4 shows a fragmentary view of another modification.

Referring more particularly to the drawing, reference character 1 designates a container or reservoir which may be located in any convenient place on an automobile A, preferably at a height above the windshield to permit a gravitational feed. In the drawing, the container has been illustrated for the sake of convenience as being mounted on the outside of the windshield frame, but it may be mounted inside or between the walls of the frame. Lugs 2 have been provided to permit the container to be fastened to the automobile by screws, although clamps, brackets, welds, rivets or the like may also be used. The container is adapted to receive and hold a can 3 which may be inserted through an opening 4. An air-tight and waterproof cover 5, preferably lined with a waterproofing substance such as cork or rubber fits over the opening 4 and is fastened to the container by hinges 6. A hook 7 and eye 8 may be mounted on the cover and container respectively to keep the cover tightly closed.

An air vent 10 which may have an adjustable port is located in the upper region of the container. Issuing from the lower part of the container is a conduit 11 which is fitted in any customary manner. The conduit is preferably made of a small metal or rubber tube and leads to the face of the windshield. It may be constructed so as to branch out or to have the mouth in a fanshaped form to distribute the liquid over the surface of the windshield. A valve 12 preferably located in a convenient position is incorporated in the tubing so as to regulate the amount of flow or to cut it off completely.

In operation, a can of non-freezing liquid such as alcohol, glycerine or the like may be supplied to specially fit in the container. Two holes are punched in the can to provide an outlet port and air holes and then it is slipped into the container and the cover closed. When the weather is cold and snow or ice begins to freeze on the windshield, the valve 12 is opened and the liquid is permitted to drip down on the windshield and to form a film thereon. As it trickles down into the path of wiper 13, it is spread over the surface of the glass as a film. A coating of non-freezing liquid is applied by this method which prevents the snow from clinging to the glass. As the wiper brushes back and forth, the snow and ice, if any has formed, is cleanly swept aside leaving the windshield clear and transparent. In this manner, driving is made safe and comfortable.

A can of liquid of an ordinary size lasts for about twenty-four hours steady operation. It can be seen that the operation of the above windshield cleaner is inexpensive, necessitating the refilling only at convenient intervals. Furthermore, the refilling may be accomplished simply and neatly by any automobile driver.

In Fig. 2, a modified embodiment is disclosed. A container 20 is divided into two parts, the lower, acting as a reservoir 21 for the fluid and the upper for supporting can 3. A flange 22 extends completely around the inner periphery of the reservoir to support a can of non-freezing liquid. It has been found preferable to provide a large flange in order to prevent the splashing of the liquid out of vent 24, particularly when the car is traveling over rough roads. A cover 25, lined with a gasket fits over the container and is secured thereto in any usual manner as one skilled in the art would readily understand. In some instances, it may be preferable to construct the container as a vertical cylinder with a screw cover in place. The vent 24 is provided in the cover so as to permit the proper amount of air to be let into the container without admitting dirt or foreign substances which may clog up the device. The vent may be constructed by the use of baffles and the like to prevent the fluid from leaking or splashing out of the vent when the car is passing over rough roads.

By having the container divided into two parts, it is possible to open the cover and to insert a can without danger of having the contents spill out. Furthermore, there is little danger of having the liquid leak out constantly due to an improper seal at the cover.

The operation of this modification is substantially the same as that hereinbefore described in connection with Fig. 1. The can is placed in the seat formed by the flange 22 after having punched the proper holes and the vent 24 opened. When it is deemed necessary by the driver, the valve 12 may be opened the proper amount according to the severeness of the cold and wind. The fluid trickles down along the windshield and is spread in a thin film by the action of the wiper which maintains the glass in a transparent condition.

Fig. 3 illustrates a container 30 which may be fastened in any suitable manner as the other embodiments. A funnel-shaped or wide-mouthed port 31, through which the container may be filled is located preferably at the top and sealed with a stopper 32. A vent is located either in the container or in the stopper so that air may be admitted as the container is emptied during operation. Leading from the bottom of the container is a conduit 11 having a valve 12 substantially as described in the aforesaid embodiments.

In Fig. 4 a further simplified embodiment is illustrated. A conduit 40 having a valve 41 therein to regulate the flow of liquid, is fastened to the automobile in any suitable place adjacent to the windshield. At the upper end of the conduit is a mouth 43 having fastening means. In the drawing, a threaded chamber is shown which is adapted to receive the threaded opening of a can or other container 44. This container may be specially designed to fit the mouth 43 and then may be sold in the market with a suitable non-freezing fluid particularly for this purpose.

It will be noted that the conduit and threaded port may be incorporated in the body of an automobile in such a manner that it does not interfere with the artistic or stream-lining effects of the body design. This is particularly suitable for hot weather when the device will not be in use. As soon as frost begins to appear, however, it will only be necessary to purchase a special container of non-freezing liquid and fasten it into the mouth 43. In this manner, I have simplified to a considerable extent, the auxiliary device which is carried on the automobile and by the use of which it is possible to build up a distinctive trade for the sale of specially designed cans of non-freezing liquid.

With regard to the method involved in the present invention, I establish a body of low-temperature freezing liquid such as glycerine, glycol, saline solution, alcohol, and/or other suitable anti-freeze liquids. It is desirable to use a liquid which will not damage the finish on the car, but on the contrary will provide a polish when the rain and ice have disappeared. I have found that glycerine and glycol give good results. This body of liquid is preferably located at a height above the top of the windshield at a point from which gravity flow will carry it to the windshield. Of course, it may be pumped if desired to the proper place.

When the weather is particularly bad, especially in winter when ice tends to form on the windshield so as to interfere with the clear vision and with the operation of the windshield wiper, a flow of the liquid is released from the reservoir, preferably a drop at a time. This trickles onto the upper portion of the windshield above a suitable spreading device, such as a conventional windshield wiper. As the liquid flows down, it comes in contact with the oscillating wiper blade and is thus spread in the form of a thin film over the face of the glass. The anti-freeze tends to convert ice and/or snow on the windshield into liquid and to prevent the further formation of ice. The water and/or aqueous solution formed by the anti-freeze liquid is brushed aside by the wiper blade and flows away.

I claim:—

In a windshield defrosting device, the combination which comprises a conduit, means for securing said conduit to an automobile, a threaded mouth on the upper end of said conduit, a readily replaceable can of anti-freeze fluid having a threaded neck portion adapted to be engaged and removably held upside down by said threaded mouth but otherwise disconnected from the automobile, valve means associated with said conduit for regulating the flow of said fluid, and means associated with the lower end of said conduit for distributing said anti-freeze fluid in a thin film over the outer surface of the windshield.

THEODORE J. GERWER.